United States Patent [19]  [11] 3,906,024
Moore et al.  [45]*Sept. 16, 1975

[54] PERFLUOROALKANESULFONAMIDOARYL COMPOUNDS

[75] Inventors: George G. I. Moore, Birchwood; Joseph Kenneth Harrington, Edina, both of Minn.

[73] Assignee: Minnesota Mining and Manufacturing Company, St. Paul, Minn.

[ * ] Notice: The portion of the term of this patent subsequent to Oct. 8, 1991, has been disclaimed.

[22] Filed: July 3, 1972

[21] Appl. No.: 268,605

Related U.S. Application Data

[63] Continuation-in-part of Ser. No. 118,476, Feb. 24, 1971, abandoned, which is a continuation-in-part of Ser. No. 28,148, April 13, 1970, abandoned.

[52] U.S. Cl.......... 260/465 E; 260/470; 260/471 R; 260/519; 260/551 C; 260/556 F; 260/556 SN; 260/556 AC; 260/571; 71/97; 71/103; 424/289; 424/295; 424/304; 424/309; 424/317; 424/321

[51] Int. Cl........................................... C07c 143/74
[58] Field of Search............. 260/556 F, 465 E, 470, 260/519

[56] References Cited
FOREIGN PATENTS OR APPLICATIONS
738,758  10/1955  United Kingdom............. 260/556 F
856,452  12/1960  United Kingdom............. 260/556 F

*Primary Examiner*—Henry R. Jiles
*Assistant Examiner*—S. D. Winters
*Attorney, Agent, or Firm*—Alexander, Sell, Steldt & DeLaHunt

[57] ABSTRACT

Aryl-substituted perfluoroalkanesulfonanilides in which the aryl group comprises two optionally substituted phenyl rings linked by oxygen, and corresponding N-substituted compounds, are active herbicides and some are anti-inflammatory agents.

17 Claims, No Drawings

PERFLUOROALKANESULFONAMIDOARYL COMPOUNDS

This is a continuation-in-part of the copending application, Ser. No. 118,476 filed Feb. 24, 1971, now abandoned, which is a continuation-in-part of the copending application Ser. No. 28,148 filed Apr. 13, 1970, now abandoned.

This invention relates to aryl-substituted perfluoroalkanesulfonanilides in which the aryl group comprises two optionally substituted phenyl rings linked by oxygen, and the corresponding N-substituted compounds, which are active herbicides and some are anti-inflammatory agents. Methods for the preparation and use of the compounds are also included.

Diphenyl ethers which are substituted by chloroaryl-, chloroalkyl-, chloroaralkyl- and chlorocycloalkylsulfonamido groups have been alluded to heretofore. Thus, see British Pat. Nos. 738,758, 854,956 and 856,452, French Pat. No. 1,188,591 and U.S. Pat. No. 3,223,582. However, none of these patents disclose or suggest the compounds of the present invention in which the diphenyl ether is substituted by a perfluoroalkylsulfonamido group. Furthermore, the herbicidal activity of the compounds of the invention is not suggested by the prior art.

It is an object of the invention to provide compounds which modify the growth of plants, i.e. which prevent, alter, destroy or otherwise affect the growth of plants.

It is another object of the invention to provide compounds which act as polymer curing agents.

It is a further object of the invention to provide a method for controlling unwanted plants.

It is a further object of the invention to provide a method for controlling inflammation of mammalian tissue.

It is still another object of the invention to provide herbicidal compositions containing one or more perfluoroalkanesulfonamidoaryl compounds as active ingredients therein.

It is still another object of the invention to provide anti-inflammatory compositions containing one or more perfluoroalkanesulfonamidoaryl compounds as active ingredients therein.

Still other objects will be made apparent by the following specification.

DETAILED DESCRIPTION OF THE INVENTION

According to the present invention, there is provided a class of compounds of the formula

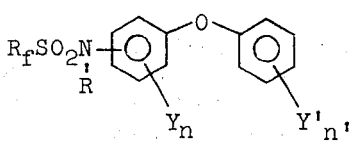   I wherein $R_f$ is a lower perfluoroalkyl radical, R is hydrogen, cyano, alkyl, alkylsulfonyl, a horticulturally acceptable cation or $$-\overset{O}{\underset{\|}{C}}-A-R'.$$

where R' is alkyl and A is oxygen or a carbon-carbon bond, Y and Y' are independently halogen, alkyl, alkoxy, nitro, amino, alkanamido, hydroxy, dialkylamino, alkoxycarbamoyl, cyano, alkylthio, alkylsulfonyl, alkanoyl, carboxyl, carbalkoxy, aminoalkyl, carboxamido, dialkylsulfamoyl or alkylsulfinyl provided that when Y is in the 4 or 5 position with respect to the $-NRSO_2R_f$ group and the group

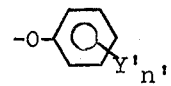

is in the 2 position with respect to the $-NRSO_2R_f$ group, Y is not nitro, amino, alkanamido, dialkylamino or alkoxycarbamoyl, and n and n' are independently 0-2 (i.e. zero, one or two) provided that the individual aliphatic groups appearing in the compounds of Formula I (i.e. in $R_f$, R, R', Y and Y') contain from one to four carbon atoms each (i.e. are "lower" aliphatic groups). By alkanamido herein is meant the group

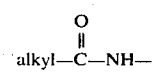

and by alkoxycarbamoyl is meant

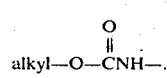

When n is zero, the phenyl ring bonded to the perfluoroalkylsulfonamido group is unsubstituted except for that group and the optionally substituted phenoxy group shown in the formula. Similarly, when n' is zero, the phenyl ring to which Y' is bonded is unsubstituted except for the group shown in the formula connected through the phenoxy oxygen atom.

Compounds of the invention wherein R is hydrogen or a cation are presently preferred. Preferably, also, the individual aliphatic groups in $R_f$, R, R', Y and Y' contain one or two carbon atoms, and most preferred is one carbon atom.

$R_f$ may be either a straight or branched chain perfluoroalkyl radical and preferably contains one or two carbon atoms. Most preferably $R_f$ is trifluoromethyl, since the herbicidal activity of these compounds of the invention is generally greater.

The compounds of the invention are acidic in nature when R is hydrogen. Consequently, they form salts, i.e. compounds of Formula I wherein R is a pharmaceutically or agriculturally acceptable cation. These are generally metal, ammonium and organic amine salts and can be prepared by treating the acid form (compounds of Formula I in which R is hydrogen) with a stoichiometrically equivalent amount of an appropriate base under mild conditions. Among the metal salts of the invention are alkali metal (e.g. lithium, sodium and potassium), alkaline earth metal (e.g. barium, calcium and magnesium) and heavy metal (e.g. zinc and iron) salts as well as other metal salts such as aluminum. Appropriate bases for use in preparing the metal salts include metal oxides, hydroxides, carbonates, bicarbonates and alkoxides. Some salts are also prepared by cation exchange reactions (by reacting a salt of the invention with an organic or inorganic salt in a cation exchange reaction). The organic amine salts include the salts of aliphatic (e.g. alkyl), aromatic and heterocyclic amines, as well as those having a mixture of these types of structures. The amines useful in preparing the salts of the invention can be primary, secondary or tertiary and preferably contain not more than 20 carbon atoms. Such amines include, for example, morpholine, methyl cyclohexylamine, glucosamine, etc. These and the ammonium salts can be prepared by reacting the acid form with the appropriate organic base or ammonium hydroxide. The pharmaceutically acceptable salts are genrally the alkali metal, alkaline earth, ammonium and amine salts. Any of the salts of the types set out above are agriculturally acceptable, the one chosen depending upon the particular use and upon the economics of the situation.

The salts of the invention are frequently formed by reacting the precursors in aqueous solution. This solution can be evaporated to obtain the salt of the compound, usually as a dry powder. In some cases, it may be more convenient to use a non-aqueous solvent such as alcohols, acetone, etc. The resulting solution is then treated to remove the solvent, for example by evaporation under reduced pressure. Since many of the salts are water soluble, they are often used in making pharmaceutical preparations in the form of capsules for oral administration.

The compounds of this invention wherein R is hydrogen (the acid form) are prepared by two different methods from precursors (i.e. compounds not falling within the scope of Formula I) and, in addition, certain of the compounds of Formula I are prepared from other compounds of Formula I, as shown below.

Method A

This is the most general process and can be described as follows:

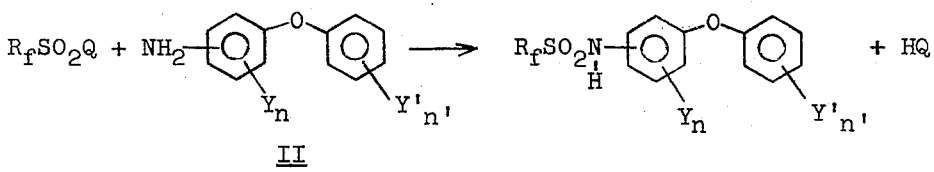

where Q is a halogen or the corresponding anhydride residue $OSO_2R_f$, and $R_f$, Y, Y', n and n' are as previously defined. The reaction is usually run in the presence of a suitable acid acceptor, which may be an organic or inorganic base. When Q is halogen it is preferably fluorine.

A solution of the appropriate primary arylamine of Formula II and at least an equimolar quantity of a suitable acid acceptor (such as dimethylaniline or triethylamine) in an inert organic solvent is prepared. Among the suitable solvents are glyme, benzene, dichloromethane and chloroform. An equimolar quantity of the appropriate perfluoroalkanesulfonic anhydride or halide is added to the solution. The addition is advantageously carried out at −15° to 150° C., but this may be raised or lowered if desired. In cases where the amine is of lower reactivity, it is advantageous to allow the reaction mixture to remain at reflux temperature for a few hours following addition.

After completion of the reaction, the product is isolated by conventional methods. For example, the reaction mixture can be extracted with excess aqueous sodium hydroxide. The aqueous extract is then washed with organic solvents and treated with charcoal to remove impurities. Subsequent acidification of the aqueous extract with mineral acid then affords the product as an oil or solid which is distilled, sublimed, chromatographed or recrystallized as required to give pure product. When water-soluble solvents are used, the reaction mixture can be poured directly into aqueous mineral acids. The product is then isolated by conventional extraction techniques and purified as above.

The reaction may also be run in a closed reactor. When this is done, solvent is not usually necessary, Q is usually fluorine and an acid acceptor, generally triethylamine, is necessary. The temperatures utilized depend on the reactivity of the reactants, but may be between 0° and 200° C., and are generally 50° to 150° C.

Method B

Some of the compounds of the invention can also be prepared by the nucleophilic displacement reaction of a metal salt of an aromatic compound with a halogen derivative as follows:

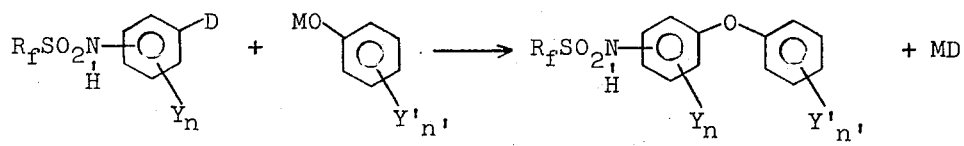

wherein D is halogen (chlorine, bromine or iodine) and M is alkali metal or copper and $R_f$, Y, Y', n and n' are as defined hereinabove, provided that if Y or Y' is halogen, said halogen is a lower molecular weight halogen than D.

Solvents used in the reaction are pyridine, quinoline, dimethylformamide and the like. Cuprous chloride is a suitable cuprous catalyst for the reaction. The alkali metal salts may be performed or formed in situ. Temperatures of 0° to 200° C. may be used, depending upon the reactivity of the substrates. Extended reaction periods are sometimes necessary.

Method C

This includes the various ways in which Y and Y' are changed in the compounds of Formula I. For example, compounds wherein Y or Y' is amino are readily prepared by reduction of nitro compounds, compounds wherein Y or Y' is alkanamido are prepared by acylation of amino compounds, compounds of Formula I wherein R is hydrogen can be nitrated or halogenated on the phenyl rings. When Y or Y' is alkylthio it is readily oxidized to alkylsulfinyl or alkylsulfonyl. Compounds wherein Y or Y' is hydroxy and R is hydrogen are preferably prepared by simple hydrogen iodide cleavage of the corresponding compound wherein Y or Y' is alkoxy. When Y or Y' is amino, it can be converted to dialkylamino by known methods. The diazonium salts of these primary amines can be converted to sulfonyl chlorides, cyano and halo derivatives by known methods.

Method D

This includes the various ways in which R is changed in compounds of Formula I. Preferably in carrying out such processes to prepare compounds in which Y or Y' is hydroxy, the hydroxy is protected using conventional methods such as formation of the comparable benzyloxy compound, followed by regeneration of the hydroxy group. The preparation of the salts (wherein R is a cation) from the acid form compounds has already been discussed. To prepare the compounds of the invention wherein R is lower alkyl, compounds of Formula I wherein R is a metal ion, for example sodium or potassium, are reacted with a stoichiometric amount of alkyl bromide or iodide or a dialkyl sulfate in a nonreactive solvent such as acetone.

Compounds of the invention wherein R is cyano are prepared by reacting the corresponding compounds of the invention wherein R is a cation such as sodium or potassium with cyanogen chloride or bromide in a nonreactive solvent.

Compounds of the invention wherein R is alkylsulfonyl are prepared by reacting the corresponding compounds of the invention wherein R is a cation such as sodium or potassium with an alkylsulfonyl chloride.

Compounds of the invention wherein R is a

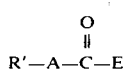

radical are prepared by reacting the corresponding compounds wherein R is a cation with an acylating agent of the formula

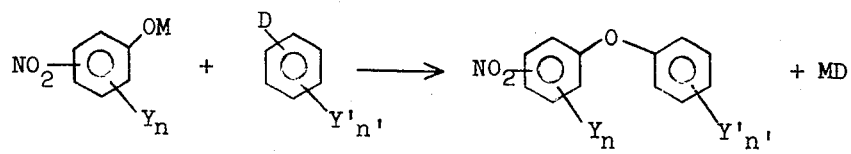

wherein A and R' are as defined hereinabove and E is halogen, preferably fluorine, chlorine or bromine, or the residue of an anhydride, i.e. an acyloxy group.

Suitable perfluoroalkanesulfonyl anhydrides and halides (for example chlorides and fluorides) for use in preparing compounds of Formula I are known to the art. The primary arylamines of Formula II are also either known to the art, or may be made by methods well known to the art, generally by the reduction of the corresponding nitro compound. Conventional reduction techniques, both chemical and catalytic, are used, such as iron in acetic acid, sodium sulfide, and most commonly Raney nickel and hydrogen gas. The nitro compound precursors of the compounds of Formula II are also known to the art, or may be prepared by well known methods, as described (Methods (1) and (2)) and exemplified hereinafter.

Method (1)

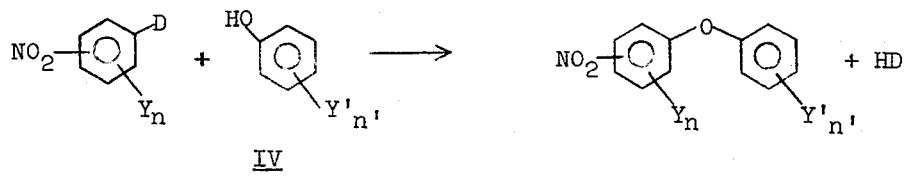

where Y, Y', D, $n$ and $n'$ are as previously defined. Although the reaction may be run in the presence of a base which acts as an accelerator and acid acceptor, it is preferably carried out by prereacting the compound of Formula IV with base to form a salt, and salts of inorganic bases are preferred. It is known that such salts are readily prepared, and they may be prepared in situ, or isolated. Most preferred are salts of alkali metals, such as sodium and potassium, or cuprous salts. Copper salts are generally not isolated. When alkali metal salts are used, dimethylformamide and pyridine are preferred solvents. When Y is an electron-donating substituent such as alkyl or alkoxy in the 2 or 4 positions relative to the nitro group, pyridine is the preferred solvent, and a trace of cuprous chloride is used as catalyst.

Cuprous salts or cuprous chloride catalyst and pyridine as solvent are preferred in order to prepare 3-phenoxynitrobenzenes. It is preferred that D is bromine or iodine, since higher yields are obtained, although when D is chlorine some product is usually isolable.

When Y is an electron-donating substituent or when a compound wherein

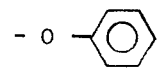

is oriented meta to the nitro group is the desired product it is preferred that pyridine is the solvent, cuprous chloride is used as a catalyst and a sodium salt of the compound of Formula IV is preformed.

Method (2)

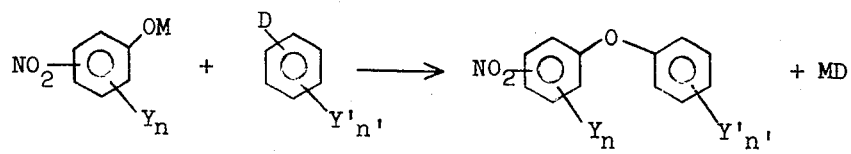

where Y, Y', D, M, $n$ and $n'$ are as previously defined, provided that M is preferably copper in the cuprous form. When Y is an electron-withdrawing group M may be an alkali metal, but in all cases it is preferred that M is copper and D is bromine or iodine. A cuprous catalyst can also be used.

The starting materials necessary for use in Methods (1) and (2) are known to the art and are in the general chemical literature or synthetic methods are known to prepare the starting materials.

A wide variety of acylating agents of Formula III can be used in preparing the compounds of the invention, including acyl halides or anhydrides, haloformates and the like. These compounds are either available directly, or in the case of certain chloroformates are easily prepared from phosgene and the appropriate alcohol.

As noted previously, the compounds of the invention are active herbicides and some are also anti-inflammatory agents. Further, some are analgesic and anti-pyretic agents and some have been found to possess anti-microbial activity.

When R is hydrogen the compounds of the invention are acidic and are also useful as catalysts or initiators for certain polymerizations. When so used, the compounds are mixed with the monomer or prepolymer. Suitable monomers include epoxide and vinyl ether monomers. The rate of reaction and the degree of polymerization varies depending upon the temperature at which the polymerization is carried out and the reactivity of the monomer, and heating of the polymerization reaction is generally utilized to obtain a faster polymerization rate.

The herbicidal activity of representative compounds of Formula I has been determined using screening tests against experimental plantings. Both pre- and post-emergence activity are determined in a direct screen against selected weed species. The following are examples of weeds which are used for these tests.

Grasses

Giant foxtail (*Setaria faberii*)
Barnyard grass (*Echinochloa crusgalli*)
Crabgrass (*Digitaria ischaemum*)
Quackgrass (*Agropyron repens*)

Broadleaves

Pigweed (*Amaranthus retroflexus*)
Purslane (*Portulaca oleracea*)
Wild Mustard (*Brassica kaber*)
Wild morning glory (*Convolvulus arvensis*)

The test chemicals are dissolved in a small amount of acetone or other suitable solvent and then diluted with water to give a concentration of 2000 ppm. From this concentration aliquots are diluted to give a final concentration of 500 ppm. Eighty ml. of this solution are added to a 6-inch pot containing the weed seeds to give a concentration equivalent to 20 lb./acre. All subsequent waterings are made from the bottom. Two pots are used per treatment. Data are taken 2 to 3 weeks after treatment and recorded as percent pre-emergence kill for each species compared to the untreated controls. Some screening is done at 5, 10 and 40 lb./acre.

To assess post-emergence activity, the same weed mixtures are allowed to grow from 2 to 3 weeks until the grasses are approximately 1 to 3 inches and the broadleaves 1½ inches tall. They are sprayed for approximately 10 seconds or until good wetting of the leaf surface occurs with a 2000 ppm solution as described above.

Data are taken 2 to 3 weeks after treatment and recorded as percent kill for each species compared to the untreated controls.

The compounds of this invention are broadly active as herbicides. The mechanism(s) by which this herbicidal activity is effected is not presently known. However, many of the compounds of this invention also show various types of plant growth modifying activity. Plant growth modification as defined herein consists of all deviations from natural development, for example defoliation, stimulation, stunting, retardation, desiccation, tillering, dwarfing, regulation and the like. This plant growth modifying activity is generally observed as the compounds of the invention begin to interfere with certain processes within the plant. If these processes are essential, the plant will die if treated with a sufficient dose of the compound. However, the type of growth modifying activity observed varies among types of plants. It has been found that with certain compounds of the invention, herbicidal activity can be separated from certain desirable growth modifying activities by controlling the rate of application.

Presently preferred herbicidal compounds of this invention are 4-phenoxytrifluoromethanesulfonanilide and 5-chloro-2-phenoxytrifluoromethanesulfonanilide.

For application to plants, the compounds can be finely divided and suspended in any of the usual aqueous media. In addition, spreading agents, wetting agents, sticking agents or other adjuvants can be added as desired. Dry powders, as such or diluted with inert materials such as diatomaceous earth, can likewise be used as dusts for this purpose. The preparations are coated on the plants or the ground is covered with them when pre-emergence control is desired. Application is made with the usual sprayers, dust guns and the like. Application rates are at 0.5 to 20 lbs./acre in general, but may be increased or reduced according to individual circumstances of use.

The anti-inflammatory activity can be conveniently demonstrated using assays designed to test the ability of these compounds to antagonize the local edema characteristic of the inflammatory response (rat foot edema test) and to inhibit the onset of the erythematous manifestation of inflammation (guinea pig erythema test). Leading references to the rat foot edema test are:
1. Adamkiewicz at al., Canad. J. Biochem. Physio. 33:332, 1955;
2. Selye, Brit. Med. J. 2:1129, 1949 and
3. Winter, Proc. Soc. Exper. Biol. Med. 111:554, 1962.

Leading references to the guinea pig erythema test are:
1. Wilhelmi, Schweiz. Med. Wschr. 79:557, 1949 and
2. Winder et al., Arch. Int. Pharmacodyn 116:261, 1958.

The compounds are preferably administered orally when used as anti-inflammatory agents but other known methods of administration are contemplated as well, e.g. dermatomucosally (for example dermally, rectally, and the like) and parenterally, for example by subcutaneous injection, intramuscular injection, intravenous injection and the like. Ocular administration is also included. Dosages ordinarily fall within the range of about 1 to 500 mg./kg. of body weight of the mammal to be treated although oral dosages are not usually above 100 mg./kg. and injection dosages are not usually above 50 mg./kg. Suitable forms for oral administration include liquids (such as 4 percent acacia suspensions), solutions of the salts (which are, as expected, generally water soluble), tablets (which may contain anhydrous lactose, microcrystalline cellulose, modified starch, calcium stearate and talc, as well as other conventional compounding agents together with the active anti-inflammatory agent) and capsules. Suitable carriers for topical application include creams, gels, tapes and the like. Liquid formulations, such as solutions or suspensions of the active ingredient in inert carriers, are contemplated for dosage by injection.

Analgesic activity has been observed in standard test methods such as the Randall-Selitto and phenylquinone writhing tests. Anti-inflammatory activity may also be detected by assays known to the art such as the cotton pellet granuloma and adjuvant arthritis tests.

The compounds are administered orally, for example as four percent acacia suspensions, but may also be administered parenterally. Amounts are generally about 1 to 500 mg./kg. of body weight of the mammal to be treated.

A preferred class of compounds of the invention for use as anti-inflammatory agents are the 4-cyano-2-phenoxyperfluoroalkanesulfonanilides, which may be additionally substituted on the rings. Particularly preferred compounds of the invention with respect to anti-inflammatory activity include:

5-Hydroxy-2-phenoxytrifluoromethanesulfonanilide,
4-Cyano-2-phenoxytrifluoromethanesulfonanilide,
2-Phenoxytrifluoromethanesulfonanilide,
5-Chloro-2-phenoxytrifluoromethanesulfonanilide,
5-Methyl-2-phenoxytrifluoromethanesulfonanilide,
2-(4'-Chlorophenoxy)trifluoromethanesulfonanilide,
3-Phenoxytrifluoromethanesulfonanilide,
3-Phenoxytrifluoromethanesulfonanilide,
3-(4'-Methoxyphenoxy)trifluoromethanesulfonanilide, and the pharmaceutically acceptable salts of these compounds.

The anti-microbial activity of the compounds is evaluated using a variation of the original agar-plate diffusion method of Vincent and Vincent (e.g. see Vincent, J. G., and Vincent, Helen W., Proc. Soc. Exptl. Biol. Med. 55:162–164, 1944, and Davis, B. D., and Mingioli, E. S., J. Bac. 66:129–136, 1953.

The following examples are given for the purpose of further illustrating the procedures of the present invention, but are not intended, in any way, to be limiting on the scope thereof. Thus, while the great majority of the examples relate to trifluoromethanesulfonamides, other perfluoroalkyl groups can be substituted in place thereof. Also, to avoid unduly multiplying the examples which have been selected to illustrate the invention, the examples will relate for the most part to compounds in which R is hydrogen. It is, however, understood that the corresponding compounds in which R is a cation, cyano, alkyl, alkylsulfonyl or

are also easily prepared and are likewise contemplated. Such compounds (in which R is other than hydrogen) are also useful as herbicides.

All melting points in the examples are uncorrected. The boiling points and melting points are given in degrees Centigrade and the pressures in millimeters of mercury.

Examples 1 and 2 relate to the preparation of compounds of Formula I by Method A.

EXAMPLE 1

A cooled mixture of 3-(2,3-dimethylphenoxy)aniline (13.4 g., 0.062 mole), triethylamine (9.5 ml., 0.068 mole) and dichloromethane 100 ml.) is treated with trifluoromethanesulfonic anhydride (10.7 ml., 0.063 mole) during a 15 minute period. After stirring 90 minutes 10 percent hydrochloric acid (100 ml.) is added and the solvent is removed in vacuo. The residue is taken up in 10 percent sodium hydroxide (100 ml.), the solution is extracted with diethyl ether and the aqueous layer is acidified. An oil forms, and extraction of the aqueous layer with diethyl ether is followed by drying of the ether layer over magnesium sulfate. Fractional distillation yields 3-(2,3-dimethylphenoxy)trifluoromethanesulfonanilide, b.p. 162°–164° C./0.15–0.2 mm., m.p. 62°–63° C.

| Analysis: | %C | %H | %N |
|---|---|---|---|
| Calculated for $C_{15}H_{14}F_3NO_3S$: | 52.3 | 4.1 | 4.1 |
| Found: | 51.6 | 4.0 | 4.1 |

EXAMPLE 2

An equimolar mixture of triethylamine (4g., 0.04 mole) and 3-phenoxyaniline (7.3 g., 0.04 mole) is mixed with perfluoro-n-butanesulfonyl fluoride (11.9 g., 0.04 mole) and the mixture is heated in a pressure reactor for 2 days at 90° to 100° C. The mixture is then dissolved in ethanol and treated with excess 10 percent sodium hydroxide solution. The mixture is steam distilled to remove volatile impurities, then the residue is extracted with chloroform, the extracts are dried over magnesium sulfate, filtered and evaporated in vacuo. The residue is fractionally distilled twice to provide 3-phenoxyperfluoro-n-butanesulfonanilide, b.p. 155° C./0.02 mm.

| Analysis: | %C | %H |
|---|---|---|
| Calculated for $C_{16}H_{10}F_9NO_3S$: | 41.1 | 2.2 |
| Found: | 41.3 | 2.3 |

EXAMPLE 3

The following compounds are also prepared using general Method A:

3-(4-chlorophenoxy)trifluoromethanesulfonanilide, b.p. 156° C./0.19 mm.
3-(3-chlorophenoxy)trifluoromethanesulfonanilide, b.p. 164° C./0.08 mm.
3-(2-chlorophenoxy)trifluoromethanesulfonanilide, b.p. 156° C./0.06 mm.
3-(4-methoxyphenoxy)trifluoromethanesulfonanilide, b.p. 153° C./0.35 mm.

5-chloro-3-phenoxytrifluoromethanesulfonanilide, m.p. 51°–54° C.

5-chloro-2-phenoxytrifluoromethanesulfonanilide, m.p. 66.5°–68° C.

3-phenoxytrifluoromethanesulfonanilide, b.p. 128° C./0.05 mm.

4-chloro-2-phenoxytrifluoromethanesulfonanilide, m.p. 78°–81.5° C.

3-chloro-2-phenoxytrifluoromethanesulfonanilide, m.p. 65.5°–67.5° C.

2-(4-methoxyphenoxy)trifluoromethanesulfonanilide, m.p. 95°–97° C.

2-phenoxytrifluoromethanesulfonanilide, m.p. 65°–67.5° C.

4-phenoxytrifluoromethanesulfonanilide, m.p. 78.5°–80° C.

2-(4-fluorophenoxy)trifluoromethanesulfonanilide, m.p. 69°–70° C.

2-(2-chlorophenoxy)trifluoromethanesulfonanilide, b.p. 150° C./0.8 mm.

2-(2-methylphenoxy)trifluoromethanesulfonanilide, b.p. 140° C./0.8 mm.

2-(4-methylphenoxy)trifluoromethanesulfonanilide, m.p. 77°–82° C.

4-methyl-2-phenoxytrifluoromethanesulfonanilide, m.p. 50°–52° C.

2-methyl-4-phenoxytrifluoromethanesulfonanilide, m.p. 91°–93° C.

5-methyl-2-phenoxytrifluoromethanesulfonanilide, m.p. 65.5°–68° C.

6-methyl-2-phenoxytrifluoromethanesulfonanilide, m.p. 79°–81° C.

5-methoxy-2-phenoxytrifluoromethanesulfonanilide, m.p. 63°–64° C.

3-methyl-2-phenoxytrifluoromethanesulfonanilide, m.p. 68°–70° C.

EXAMPLE 4

5-Methoxy-2-phenoxytrifluoromethanesulfonanilide (15 g., 0.043 mole) is placed in glacial acetic acid (150 ml.) and the mixture is heated to reflux temperature (about 130° C.). Excess hydroiodic acid (57%, 64 ml.) is added and the mixture is maintained at its reflux temperature for about 16 hours. The mixture is diluted with water, then extracted with dichloromethane. The dichloromethane extracts are combined and dried over magnesium sulfate, then the solvent is removed in vacuo. The solid residue is recrystallized twice from a mixture of hexane and benzene with treatment with decolorizing charcoal to give white crystals of 5-hydroxy-2-phenoxytrifluoromethanesulfonanilide, m.p. 94°–96° C.

| Analysis: | %C | %H | %N |
|---|---|---|---|
| Calculated for $C_{13}H_{10}F_3NO_4S$: | 46.9 | 3.0 | 4.2 |
| Found: | 47.2 | 3.1 | 4.2 |

The following compound is prepared using the method of Example 4.

3-(4-hydroxyphenoxy)trifluoromethanesulfonanilide, b.p. 215–217/0.5 mm.

EXAMPLE 5

To a solution of 2-nitro-4-phenoxytrifluoromethanesulfonanilide (5.5 g., 0.015 mole) in ethanol is added Raney nickel and the mixture is reduced under about 45 psi of hydrogen. The Raney nickel is deactivated with sulfur, the mixture is filtered and the filtrate is evaporated in vacuo. The residue is dissolved in diethyl ether, treated with decolorizing charcoal, filtered and triethylamine is added with stirring. The product, isolated by filtration, is triethylammonium 2-amino-4-phenoxytrifluoromethanesulfonanilide, m.p. 113°–117° C.

| Analysis: | %C | %H | %N |
|---|---|---|---|
| Calculated for $C_{13}H_{11}F_3N_2O_3S \cdot C_6H_{15}N$: | 52.7 | 6.0 | 9.7 |
| Found: | 52.5 | 6.0 | 9.5 |

EXAMPLE 6

2-Phenoxytrifluoromethanesulfonanilide (31.7 g., 0.10 mole) and sodium acetate (9.2 g., 0.11 mole) are stirred into 150 ml. of acetic acid. Bromine (16 g., 0.10 mole) is added over 15 minutes and the mixture is stirred for 6 hours. The mixture is poured into water and the product is isolated by filtration and dissolved in dichloromethane. The solution is dried over magnesium sulfate, filtered and evaporated in vacuo. The residue is distilled to provide 4-bromo-phenoxytrifluoromethanesulfonanilide, b.p. 150° C./0.2 mm., m.p. 85°–90° C.

| Analysis: | %C | %H | %N |
|---|---|---|---|
| Calculated for $C_{13}H_9BrF_3NO_3S$: | 39.4 | 2.3 | 3.5 |
| Found: | 38.9 | 2.3 | 3.5 |

EXAMPLE 7

Sodium acetate (0.92 g., 0.011 mole) and 4-bromo-2-phenoxytrifluoromethanesulfonanilide (3.96 g., 0.010 mole) are stirred in 100 ml. of acetic acid and bromine (1.6 g., 0.010 mole) is added over 10 minutes and the mixture is heated to 70° C. and stirred about 16 hours, then poured into water. The mixture is extracted with dichloromethane, the extracts are dried over magnesium sulfate, filtered and evaporated in vacuo. The residue is distilled and the product is dissolved in diethyl ether, treated with decolorizing charcoal and filtered. Excess triethylamine is added to the solution and the solid is isolated by filtration and recrystallized from isopropanol to provide triethylammonium 2,4-dibromo-6-phenoxytrifluoromethanesulfonanilide, m.p. 119°–121° C.

| Analysis: | %C | %H | %N |
|---|---|---|---|
| Calculated for $C_{13}H_8Br_2F_3NO_3S \cdot C_6H_{15}N$: | 39.6 | 4.0 | 4.9 |
| Found: | 38.3 | 3.9 | 4.5 |

EXAMPLE 8

Under a nitrogen atmosphere 4-bromo-2-phenoxytrifluoromethanesulfonanilide (19.8 g., 0.050 mole) and sodium hydroxide (17.8 ml. of 15 percent aqueous solution, 0.05 mole) are stirred in 30 ml. of quinoline and benzene is added. The mixture is distilled to remove the water-benzene azeotropic mixture, then cuprous methylthiolate (6.63 g., 0.060 mole) is added and the mixture is heated and stirred at 200° C. for about 16 hours. After cooling dichloromethane and excess aqueous hydrochloric acid are added and stirred thoroughly. The mixture is filtered, the dichloromethane layer is separated and the aqueous layer extracted with more dichloromethane. The extracts are dried over magensium sulfate, filtered, then evaporated in vacuo. The residue is distilled to provide 4-methylthio-2-phenoxytrifluoromethanesulfonanilide as a yellow oil, slowly crystallizing, m.p. 82°–84° C.

EXAMPLE 9

4-Methylthio-2-phenoxytrifluoromethanesulfonanilide is oxidized using an excess of hydrogen peroxide in acetic acid on a steam bath. The product is precipitated by the addition of water then recrystallized from ethanol to give 4-methylsulfonyl-2-phenoxytrifluoromethanesulfonanilide, m.p. 182°–184° C.

EXAMPLE 10

A mixture of quinoline (30 ml.), 4-bromo-2-phenoxytrifluoromethanesulfonanilide (19.8 g., 0.050 mole), 10 percent aqueous sodium hydroxide (17.8 ml., 0.050 mole) and benzene (50 ml.) is distilled under nitrogen to remove the benzene-water azeotrope. Then, cuprous cyanide (4.48 g., 0.05 mole) is added and the mixture is cooled, then stirred and heated at 200° C. for 16 hours. The mixture is cooled, then stirred while adding dichloromethane and aqueous hydrochloric acid and then filtered. The filtrate is evaporated in vacuo, then distilled. The cut boiling at about 195° C./0.2 mm. is washed with cold 10 percent sodium hydroxide solution, stirred with excess dichloromethane and 10 percent aqueous hydrochloric acid until dissolved, extracted further with dichloromethane and the extracts dried over magnesium sulfate. The dried dichloromethane solution is filtered and evaporated in vacuo. The residue is recrystallized from hexane and the product is white crystals of 4-cyano-2-phenoxytrifluoromethanesulfonanilide, m.p. 118°–120° C.

| Analysis: | %C | %H | %N |
|---|---|---|---|
| Calculated for $C_{14}H_9F_3N_2O_3S$: | 49.1 | 2.6 | 8.2 |
| Found: | 49.4 | 2.5 | 8.1 |

EXAMPLE 11

A mixture of 2-phenoxytrifluoromethanesulfonanilide (20 g., 0.063 mole) and sodium carbonate (16 g., 0.15 mole) is stirred in acetone (150 ml.) for 5 hours, then acetyl chloride (10 g., 0.13 mole) is added and the mixture is stirred about 16 hours. The mixture is filtered, then evaporated in vacuo and the residue is recrystallized twice from hexane with treatment with decolorizing charcoal. The white solid is N-acetyl-2-phenoxytrifluoromethanesulfonanilide, m.p. 89°–90.5° C.

| Analysis: | %C | %H | %N |
|---|---|---|---|
| Calculated for $C_{15}H_{12}F_3NO_4S$: | 50.1 | 3.4 | 3.9 |
| Found: | 50.3 | 3.4 | 3.9 |

EXAMPLE 12

Sodium hydroxide (0.033 mole as 1.0 N solution) is mixed with 3-phenoxytrifluoromethanesulfonanilide (10.5 g., 0.033 mole) and stirred to obtain a mixture with pH 7. The water is removed by evaporation in vacuo. The product, sodium 3-phenoxytrifluoromethanesulfonanilide, is mixed with ethyl chloroformate (3.7 g., 0.037 mole) in acetone (100 ml.) and stirred for 1 day. The mixture is evaporated in vacuo and the residue is dissolved in chloroform, washed with water, dried over magnesium sulfate, filtered and evaporated in vacuo. The residue is distilled to provide N-carbethoxy-3-phenoxytrifluoromethanesulfonanilide, b.p. 175° C./0.1 mm.

| Analysis: | %C | %H |
|---|---|---|
| Calculated for $C_{16}H_{14}F_3NO_5S$: | 49.4 | 3.6 |
| Found: | 49.5 | 3.7 |

EXAMPLE 13

3-Phenoxytrifluoromethanesulfonanilide is dissolved in acetone, treated with an equimolar amount of sodium carbonate and stirred 1 hour. Excess methyl iodide is added and the mixture is stirred overnight. The mixture is filtered and the filtrate evaporated in vacuo. The residue is extracted with a mixture of chloroform and water, then the chloroform layer is dried over anhydrous magnesium sulfate. The chloroform is evaporated in vacuo to give a residue which is distilled. The product, N-methyl-3-phenoxytrifluoromethanesulfonanilide, boils at 124°–126° C./0.05 mm.

Example 14 relates to the preparation of amine salts according to Formula I from the acid-form compounds.

EXAMPLE 14

The preparation of triethylammonium 3-phenoxyperfluoroethanesulfonanilide.

Crude 3-phenoxyperfluoroethanesulfonanilide (4.7 g., 0.10 mole), prepared from perfluoroethanesulfonyl fluoride and 3-phenoxyaniline by Method A, diisopropyl ether (50 ml.) and triethylamine (20.2 g., 0.20 mole) are stirred for 6 hours at room temperature, the solution is filtered and the salt is isolated by removing the volatiles in vacuo. The product is triethylammonium 3-phenoxyperfluoroethanesulfonanilide, which is recrystallized from a diisopropyl ether-isopropanol mixture, m.p. 80.5°–82.5° C.

| Analysis: | %C | %H | %N |
|---|---|---|---|
| Calculated for $C_{14}H_{10}F_5NO_3S$: | 51.3 | 5.4 | 6.0 |
| Found: | 51.4 | 5.4 | 5.8 |

Using the procedure of Example 14 the following compounds are prepared:
triethylammonium 5-chloro-2-(2,4-dichlorophenoxy)trifluoromethanesulfonanilide, m.p. 127°–129° C.
triethylammonium 2-(4-chlorophenoxy)trifluoromethanesulfonanilide, m.p. 78°–84° C.

EXAMPLE 15

4-Carboxyl-2-phenoxytrifluoromethanesulfonanilide (4.9 g., 0.0136 mole) is stirred into 100 ml. of dichloromethane and excess thionyl chloride and one drop of dimethylformamide are added. The mixture is heated at reflux temperature for 2 hours, then evaporated in vacuo. The residue is diluted with excess ethanol and the mixture is poured into a solution of treithylamine in ethanol. The mixture is stirred for an hour and heated on a steam bath for 2 hours, then evaporated in vacuo. The residue is dissolved in isopropanol and treated with decolorizing charcoal, then filtered and evaporated in vacuo. The residue is refluxed in acetone with excess sodium carbonate overnight. The solution is filtered, washed with water than evaporated in vacuo. The residue is recrystallized twice from hexane to give 4-ethoxycarbonyl-2-phenoxytrifluoromethanesulfonanilide, m.p. 85°–87.5° C.

| Analysis: | %C | %H | %N |
|---|---|---|---|
| Calculated for $C_{16}H_{14}F_3NO_5S$: | 49.3 | 3.6 | 3.6 |
| Found: | 49.5 | 3.5 | 3.6 |

EXAMPLE 16

3-Phenoxytrifluoromethanesulfonanilide (11.4 g., 0.036 mole) is added with stirring to glacial acetic acid (125 ml.) and 70 percent nitric acid (3.22 g., 0.036 mole) is added gradually over 15 minutes. The mixture is heated to reflux and refluxed for 1 hour. The extent of reaction is monitored by gas chromatography, and more nitric acid is gradually added and reacted until all starting material has reacted. Two main products are observed. Fractional distillation gives partial separation, with boiling point 155°–160° C./0.1 mm. and 185°–190° C./0.1 mm. Careful repeated fractional distillation of the low boiling fraction provides 2-nitro-5-phenoxytrifluoromethanesulfonanilide, b.p. 155°–160° C./0.1 mm.

| Analysis: | %C | %H | %N |
|---|---|---|---|
| Calculated for $C_{13}H_9F_3N_2O_5S$: | 43.0 | 2.5 | 7.7 |
| Found: | 43.1 | 2.5 | 7.6 |

Upon redistillation of the high boiling fraction, a fraction boiling about 180° C./0.1 mm. crystallizes. Recrystallization from ethanol-water with treatment with decolorizing charcoal gives 4-nitro-3-phenoxytrifluoromethanesulfonanilide, m.p. 63°–66° C.

| Analysis: | %C | %H | %N |
|---|---|---|---|
| Calculated for $C_{13}H_9F_3N_2O_5S$: | 43.0 | 2.5 | 7.7 |
| Found: | 42.9 | 2.5 | 7.6 |

The following compounds are prepared using the method of Example 16:
2-nitro-4-phenoxytrifluoromethanesulfonanilide, m.p. 68.5°–70° C.
4-bromo-2-nitro-6-phenoxytrifluoromethanesulfonanilide, m.p. 75°–77.5° C.

EXAMPLE 17

2-Phenoxytrifluoromethanesulfonanilide is nitrated according to the method of Example 16 to provide 4-nitro-2-phenoxytrifluoromethanesulfonanilide, which is reduced according to the method of Example 5 to provide 4-amino-2-phenoxytrifluoromethanesulfonanilide.

4-Amino-2-phenoxytrifluoromethanesulfonanilide (9.95 g., 0.030 mole) is dissolved in concentrated hydrochloric acid, chilled to 0° C. and treated dropwise with a solution of sodium nitrite (2.07 g., 0.030 mole) in water. This solution is added to a chilled solution of 30 percent sulfur dioxide in acetic acid (150 ml), with about 0.5 g. of cupric chloride added. After stirring 3 hours the mixture is poured into 1.5 liters of water. The solution is extracted with dichloromethane, the extracts are dried over magnesium sulfate, the solution is filtered and then evaporated in vacuo. The residue is 4-chlorosulfonyl-2-phenoxytrifluoromethanesulfonanilide which is mixed with excess dimethylamine and heated at reflux for 1 hour, then the mixture is washed with 10 percent hydrochloric acid, extracted with dichloromethane, the extracts dried over magnesium sulfate, then filtered and evaporated in vacuo. The residue is recrystallized twice from aqueous ethanol with treatment with decolorizing charcoal, then recrystallized from benzene to give white 4-dimethylsulfamoyl-2-phenoxytrifluoromethanesulfonanilide, m.p. 152°–153.5° C.

| Analysis: | %C | %H | %N |
|---|---|---|---|
| Calculated for $C_{15}H_{15}F_3N_2O_5S_2$: | 42.5 | 3.6 | 6.6 |
| Found: | 42.9 | 3.6 | 6.5 |

EXAMPLE 18

2-(4-Fluorophenoxy)trifluoromethanesulfonanilide is nitrated according to the method of Example 16 to provide 2-(4-fluorophenoxy)-4-nitrotrifluoromethanesulfonanilide, which is reduced according to the method of Example 5 to provide 4-amino-2-(4-fluorophenoxy)trifluoromethanesulfonanilide.

4-Amino-2-(4-fluorophenoxy)trifluoromethanesulfonanilide (5.6 g., 0.0124 mole) is stirred in 30 ml. of concentrated hydrochloric acid, cooled to 0° C. and sodium nitrite (1.04 g., 0.0124 mole) dissolved in a minimum amount of water is added while maintaining the temperature below 5° C. A solid forms and is separated by filtration, rinsed with water and diethyl ether and dried. The yellow product is 4-diazo-2-(4-fluorophenoxy)trifluoromethanesulfonanilide, m.p. 135°–139° C.(d.).

| Analysis: | %C | %H | %N |
| --- | --- | --- | --- |
| Calculated for | | | |
| $C_{13}H_7F_4N_3O_3S$: | 43.2 | 2.0 | 11.6 |
| Found: | 43.2 | 1.8 | 11.8 |

The diazo compound is reacted with sulfur dioxide and cupric chloride in acetic acid according to the method of Example 17 to yield 4-chlorosulfonyl-2-(4-fluorophenoxy)trifluoromethanesulfonanilide, which is reacted with dimethylamine according to the method of Example 17 to provide 4-dimethylsulfamyl-2-(4-fluorophenoxy)trifluoromethanesulfonanilide), m.p. 159°–161° C.

| Analysis: | %C | %H | %N |
| --- | --- | --- | --- |
| Calculated for | | | |
| $C_{15}H_{14}F_4N_2O_5S_2$: | 40.7 | 3.2 | 6.3 |
| Found: | 40.6 | 3.3 | 6.3 |

EXAMPLE 19

Step (1)

4-Cyano-2-phenoxytrifluoromethanesulfonanilide (6.3 g., 0.0184 mole) is mixed with excess 10 percent aqueous sodium hydroxide and heated on a steam bath. Ethanol is added to effect solution and heating is continued for 3 hours, the solution is treated with decolorizing charcoal, filtered, acidified and filtered to separate the solid product. Recrystallization from benzene gives white crystals of 4-carboxyl-2-phenoxytrifluoromethanesulfonanilide, m.p. 192°–194.5° C.

| Analysis: | %C | %H | %N |
| --- | --- | --- | --- |
| Calculated for | | | |
| $C_{14}H_{10}F_3NO_5S$: | 46.5 | 2.8 | 3.9 |
| Found: | 46.5 | 2.8 | 3.9 |

Step (2)

The product from Step (1) is refluxed in dichloromethane with 1 ml. of dimethylformamide and excess thionyl chloride until evolution of hydrogen chloride stops, then the solution is evaporated in vacuo. The residue is dissolved in tetrahydrofuran and added to a stirred solution of excess aqueous dimethylamine. After stirring 1 hour the mixture is poured into 10 percent hydrochloric acid. The product is separated by filtration and recrystallized twice from benzene with treatment with decolorizing charcoal to provide a white solid, 4-(N,N-dimethylcarbamoyl)-2-phenoxytrifluoromethanesulfonanilide, m.p. 143°–144.5° C.

| Analysis: | %C | %H | %N |
| --- | --- | --- | --- |
| Calculated for | | | |
| $C_{16}H_{15}F_3N_2O_4S$: | 49.4 | 3.9 | 7.2 |
| Found: | 49.6 | 3.9 | 7.1 |

EXAMPLE 20

Under a nitrogen atmosphere a mixture of 10 percent sodium hydroxide (0.05 mole, 17.8 ml.) and 4-bromo-2-phenoxytrifluoromethanesulfonanilide (19.8 g., 0.05 mole) in quinoline (25 ml.) and benzene are heated to reflux and the water-benzene azeotrope is removed by distillation. The mixture is then heated at 200° C. while adding cuprous cyanide (4.48 g., 0.05 mole) in 5 ml. of quinoline. Heating at 200° C. is continued for about 16 hours. After cooling, excess 10 percent hydrochloric acid is added cautiously, then the mixture is extracted with dichloromethane, the extracts are evaporated in vacuo and the residue is heated with 10 percent sodium hydroxide, then washed with dichloromethane. The aqueous layer is treated with decolorizing charcoal, filtered, acidified with concentrated hydrochloric acid, extracted with dichloromethane and the extracts evaporated in vacuo. The residue is recrystallized three times from benzene, then dissolved in 5 percent sodium hydroxide. Nitrogen is bubbled through the solution for 3 hours, then it is treated with decolorizing charcoal, filtered and acidified with concentrated hydrochloric aicd. The product, 4-carbamyl-2-phenoxytrifluoromethanesulfonanilide, is separated by filtration and dried to m.p. 135°–136.5° C.

| Analysis: | %C | %H | %N |
| --- | --- | --- | --- |
| Calculated for | | | |
| $C_{14}H_{11}F_3N_2O_4S$: | 46.6 | 3.1 | 7.8 |
| Found: | 46.7 | 3.1 | 7.5 |

EXAMPLE 21

A mixture of aluminum chloride (5.4 g., 0.04 mole), carbon disulfide (75 ml.) and N-acetyl-2-phenoxytrifluoromethanesulfonanilide (7.2 g., 0.02 mole) is stirred under a nitrogen atmosphere at reflux for about 20 hours. The mixture is then stirred into water, 10 percent hydrochloric acid is added, then the mixture is extracted with dichloromethane. The extracts are evaporated in vacuo, the residue is stirred with excess 5 percent sodium hydroxide, the solution is treated with decolorizing charcoal, filtered and acidified with concentrated hydrochloric acid. The solution is extracted with dichloromethane, the extracts dried over magnesium sulfate, filtered and evaporated in vacuo. The solid is recrystallized from benzene-hexane twice to give 2-(4-acetylphenoxy)trifluoromethanesulfonanilide, m.p. 86.5°–88° C.

| Analysis: | %C | %H | %N |
| --- | --- | --- | --- |
| Calculated for | | | |
| $C_{15}H_{12}F_3NO_4S$: | 50.1 | 3.4 | 3.9 |
| Found: | 50.4 | 3.4 | 3.8 |

EXAMPLE 22

Under a nitrogen atmosphere, a stirred solution of 4-(N,N-dimethylcarbamoyl)-2-phenoxytrifluoromethanesulfonanilide (2.7 g., 0.0695 mole) in tetrahydrofuran (60 ml.) is treated with a diborane solution (13.9 ml. of 1.0 M solution, 0.0139 mole) over 15 minutes.

The solution is then refluxed for 3 hours, then the tetrahydrofuran is removed in vacuo. The mixture is treated with 10 percent hydrochloric acid (100 ml.) and refluxed for 2 hours. The mixture is cooled, treated with decolorizing charcoal, filtered and neutralized with 10 percent sodium hydroxide solution. The solid is separated by filtration and recrystallized from a mixture of N,N-dimethylformamide and water. The product is 4-(N,N-dimethylaminomethyl)-2-phenoxytrifluoromethanesulfonanilide, m.p. 235°–240° C.

| Analysis: | %C | %H | %N |
|---|---|---|---|
| Calculated for | | | |
| $C_{16}H_{17}F_3N_2O_3S$: | 51.25 | 4.6 | 7.5 |
| Found: | 51.5 | 4.8 | 7.6 |

Example 23 relates to the preparation of precursors of compounds of Formula I.

EXAMPLE 23

Under a nitrogen atmosphere, a mixture of 2-chlorophenol (2.6 g., 0.202 mole), pyridine (25 ml.) and benzene (50 ml.) is heated to rapid reflux and treated with 0.20 equivalent of aqueous potassium hydroxide. Water is removed by azeotropic distillation, the solution is cooled below its boiling point and 3-bromo-nitrobenzene (40.4 g., 0.20 mole) and cuprous chloride (2.0 g.) are added. The mixture is then heated for 20 hours at 160° C., then mixed with 10 percent hydrochloric acid. This mixture is extracted with dichloromethane, and the organic layer is fractionally distilled to give 2-chlorophenyl 3-nitrophenyl ether, b.p. 176–182/0.75 mm.

Using the method of Example 23, the following compounds are also prepared:

2,3-dimethyl-3'-nitrodiphenyl ether, b.p. 160°–162°C./0.3 mm.

4-Chloro-3'-nitrodiphenyl ether, b.p. 165°–178° C./0.65 mm.

3-chloro-3'-nitrodiphenyl ether, b.p. 160°–180°C./0.6 mm.

4-methoxy-3'-nitrodiphenyl ether, b.p. 165° C./0.6 mm.

EXAMPLE 24

Using method B, 2-bromo-4-methylsulfonyltrifluoromethanesulfonanilide is reacted with potassium 4-methylphenoxide in quinoline with a trace of cuprous chloride as catalyst to provide 2-(4-methylphenoxy)-4-methylsulfonyltrifluoromethanesulfonanilide, isolated as the triethylammonium salt, m.p. 147°–150° C.

What is claimed is:
1. A compound of the formula

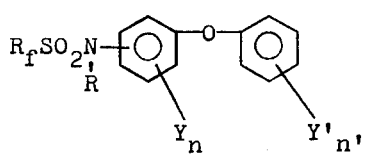

wherein $R_f$ is a perfluoroalkyl radical, R is hydrogen, alkyl, or a horticulturally acceptable cation, Y and Y' are independently halogen, alkyl, alkoxy, nitro, amino, alkanamido, hydroxy, dialkylamino, alkoxycarbamoyl, cyano, alkylthio, alkylsulfonyl, alkanoyl, carboxyl, carbalkoxy, alkylamino, carboxamido, dialkylsulfamoyl or alkylsulfinyl, provided that when Y is in the 4 or 5 position with respect to the —NRSO₂R$_f$ group and the group

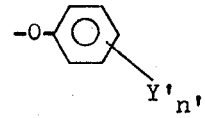

is in the 2 position with respect to the —NRSO₂R$_f$ group, Y is not nitro, amino, alkanamido, dialkylamino or alkoxycarbamoyl, and n and n' are independently 0–2 provided that the individual aliphatic groups appearing in R$_f$, R, Y and Y' contain from one to four carbon atoms each.

2. A compound according to claim 1 wherein no individual R$_f$, R, Y or Y' moiety contains more than two carbon atoms.

3. A compound according to claim 1 wherein no individual R$_f$, R, Y or Y' moiety contains more than one carbon atom.

4. A compound according to claim 1 wherein R$_f$ is trifluoromethyl.

5. A compound according to claim 1 wherein n and n' are 0.

6. A compound according to claim 1 wherein Y and Y' are halogen.

7. A compound according to claim 1 wherein R is hydrogen.

8. A compound according to claim 1 wherein R is a cation.

9. The compound 4-phenoxytrifluoromethanesulfonanilide according to claim 4.

10. The compound 5-Hydroxy-2-phenoxytrifluoromethanesulfonanilide according to claim 4.

11. The compound 4-Cyano-2-phenoxytrifluoromethanesulfonanilide according to claim 4.

12. The compound 2-Phenoxytrifluoromethanesulfonanilide according to claim 4.

13. The compound 5-Chloro-2-phenoxytrifluoromethanesulfonanilide according to claim 4.

14. The compound 5-Methyl-2-phenoxytrifluoromethanesulfonanilide according to claim 4.

15. The compound 2-(4'-Chlorophenoxy)trifluoromethanesulfonanilide according to claim 4.

16. The compoound 3-Phenoxytrifluoromethanesulfonanilide according to claim 4.

17. The compound 3-(4'-Methoxyphenoxy)trifluoromethanesulfonanilide according to claim 4.

* * * * *